(12) United States Patent  (10) Patent No.: US 8,731,095 B2
Yu et al.  (45) Date of Patent: May 20, 2014

(54) DATA TRANSMISSION METHOD, TRANSMITTER AND RECEIVER IN COORDINATED COMMUNICATION SYSTEM

(71) Applicant: Huawei Technologies Co., Ltd., Guangdong (CN)

(72) Inventors: Rongdao Yu, Shenzhen (CN); Eddy Chiu, Shenzhen (CN); Kinnang Lau, Hong Kong (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 13/760,912

(22) Filed: Feb. 6, 2013

(65) Prior Publication Data

US 2013/0148756 A1  Jun. 13, 2013

Related U.S. Application Data

(63) Continuation of application No. PCT/CN2011/073590, filed on May 3, 2011.

(30) Foreign Application Priority Data

Aug. 6, 2010  (CN) .......................... 2010 1 0252132

(51) Int. Cl.
*H04B 7/04* (2006.01)
(52) U.S. Cl.
USPC ............................ 375/267; 375/260; 375/285
(58) Field of Classification Search
USPC ................................................. 375/260, 267
See application file for complete search history.

(56) References Cited

U.S. PATENT DOCUMENTS

2008/0192717 A1  8/2008  Kent et al.
2010/0034146 A1*  2/2010  Hou et al. ..................... 370/328
(Continued)

FOREIGN PATENT DOCUMENTS

CN  101557249 A  10/2009
CN  101557367 A  10/2009
(Continued)

OTHER PUBLICATIONS

Extended European Search Report in corresponding European Patent Application No. 11780159.7 (Jul. 2, 2013).

(Continued)

*Primary Examiner* — Shuwang Liu
*Assistant Examiner* — Ross Varndell
(74) *Attorney, Agent, or Firm* — Leydig, Voit & Mayer, Ltd.

(57) ABSTRACT

The present invention provides a data transmission method, a transmitter, and a receiver in a coordinated communication system, including: precoding, by a first transmitter, its payload data by using a first precoding matrix to obtain first precoded data; precoding, by the first transmitter, coordinated data by using a second precoding matrix to obtain second precoded data to cancel interference with the first precoded data at a receiver caused by data transmitted by another transmitter; and transmitting the first precoded data and the second precoded data after the precoding to the receiver. According to the method, the first transmitter codes its payload data by using the first precoding matrix; and codes the coordinated data by using the second precoding matrix to cancel, by using different precoding matrices, the interference with the first precoded data at the receiver caused by the data transmitted by another transmitter.

20 Claims, 5 Drawing Sheets

(56) References Cited

U.S. PATENT DOCUMENTS

2010/0144334 A1* 6/2010 Gorokhov et al. ............ 455/418
2010/0172430 A1* 7/2010 Melzer et al. ................. 375/267
2011/0028156 A1 2/2011 Zhu et al.

FOREIGN PATENT DOCUMENTS

KR          20100032806 A    3/2010
WO       WO 2009088328 A1   7/2009
WO       WO 2010017482 A1   2/2010

OTHER PUBLICATIONS

Karakayali et al., "Advances in Smart Antennas—Network Coordination for Spectrally Efficient Communications in Cellular Systems," Aug. 2006, XP-001547066, IEEE Wireless Communications, New York, New York.

Papadogiannis et al., "A Dynamic Clustering Approach in Wireless Networks with Multi-Cell Cooperative Processing," 2008, XP-031266078, Institute of Electrical and Electronics Engineers, New York, New York.

Written Opinion of the International Searching Authority in corresponding PCT Patent Application No. PCT/CN2011/073590 (Aug. 11, 2011).

International Search Report in corresponding PCT Patent Application No. PCT/CN2011/073590 (Aug. 11, 2011).

* cited by examiner

DATA TRANSMISSION METHOD, TRANSMITTER AND RECEIVER IN COORDINATED COMMUNICATION SYSTEM

CROSS-REFERENCE TO RELATED APPLICATIONS

This application is a continuation of International Patent Application No. PCT/CN2011/073590, filed on May 3, 2011, which claims priority to Chinese Patent Application No. 201010252132.5, filed on Aug. 6, 2010, both of which are hereby incorporated by reference in their entireties.

FIELD OF THE INVENTION

The present invention relates to the field of communications technologies, and in particular, to a data transmission method, a transmitter, and a receiver in a coordinated communication system.

BACKGROUND OF THE INVENTION

Multiple input multiple output (Multiple Input Multiple Output, abbreviated to MIMO) is a critical technology in the 4th generation communication network.

In a MIMO system, a plurality of transmitters and receivers may use the same wireless resources to transmit data. FIG. 1 is a schematic diagram of data transmission in the prior art. The system includes transmitters S1 and S2, and receivers D1 and D2. The transmitter S1 is paired with the receiver D1. To be specific, the transmitter S1 transmits data to the receiver D1. The transmitter S2 is paired with the receiver D2. To be specific, the transmitter S2 transmits data to the receiver D2. The transmitter S1 codes data $x_1$ and transmits the coded data to the receiver D1, and meanwhile the receiver D2 is also capable of receiving the data $x_1$. The transmitter S2 codes data $x_2$ and transmits the coded data to the receiver D2, and meanwhile the receiver D1 is also capable of receiving the data $x_2$.

The data transmission method in the prior art has the following problems: The receiver D2 is capable of receiving the data $x_1$, but the data $x_1$ is not the data that needs to be transmitted to the receiver D2. Therefore, the data transmitted by the transmitter S1 causes interference with the receiver D2. Similarly, the data transmitted by the transmitter S1 may also cause interference with the receiver D1. To be specific, in the conventional MIMO system, the data transmitted by one transmitter may interfere with the data transmitted by another transmitter.

SUMMARY OF THE INVENTION

Embodiments of the present invention provide a data transmission method, a transmitter, and a receiver in a coordinated communication system, for solving the problem of interference during data transmission in a conventional MIMO system.

An embodiment of the present invention provides a data transmission method in a coordinated communication system, including:

precoding, by a first transmitter, its payload data by using a first precoding matrix to obtain first precoded data;

precoding, by the first transmitter, coordinated data by using a second precoding matrix to obtain second precoded data to cancel interference with the first precoded data at a receiver caused by data transmitted by one or more other transmitters, where the coordinated data includes at least a part of the payload data that is received by the first transmitter and transmitted by the one or more other transmitters; and transmitting, by the first transmitter, the first precoded data and the second precoded data after the precoding to the receiver.

An embodiment of the present invention provides another data transmission method in a coordinated communication system, including:

receiving, by a receiver, data transmitted by a first transmitter, data transmitted by the first transmitter, where the data transmitted by the first transmitter includes first precoded data obtained by precoding payload data of the first transmitter by using a first precoding matrix and second precoded data obtained by precoding coordinated data by using a second precoding matrix, the second precoded data is used to cancel interference with the first precoded data at the receiver caused by data transmitted by another transmitter, and the coordinated data includes at least a part of the payload data that is received by the first transmitter and transmitted by the one or more other transmitters.

An embodiment of the present invention provides a transmitter in a coordinated communication system, including:

a first precoding module, configured to precode payload data of the transmitter by using a first precoding matrix to obtain first precoded data;

a second precoding module, configured to precode coordinated data by using a second precoding matrix to obtain second precoded data to cancel interference with the first precoded data at a receiver caused by data transmitted by one or more other transmitters, where the coordinated data includes at least a part of the payload data that is received by the first transmitter and transmitted by the one or more other transmitters; and a transmitting module, configured to transmit the first precoded data and the second precoded data after the precoding to the receiver.

An embodiment of the present invention provides a receiver in a coordinated communication system, including:

a receiving module configured to receive data transmitted by a first transmitter, data transmitted by the first transmitter, where the data transmitted by the first transmitter includes first precoded data obtained by precoding payload data of the first transmitter by using a first precoding matrix and second precoded data obtained by precoding coordinated data by using a second precoding matrix, the second precoded data is used to cancel interference with the first precoded data at the receiver caused by data transmitted by another transmitter, and the coordinated data includes at least a part of the payload data that is received by the first transmitter and transmitted by the one or more other transmitters.

According to the data transmission method, transmitter, and receiver in the coordinated communication system provided in the embodiments of the present invention, during precoding, the first transmitter codes its payload data by using the first precoding matrix to obtain the first precoded data, and codes the coordinated data by using the second precoding matrix to obtain the second precoded data to cancel, by using different precoding matrices, the interference with the first precoded data at the receiver caused by the data transmitted by one or more other transmitters, thereby solving the problem of interference during data transmission in the prior art.

DETAILED DESCRIPTION OF THE EMBODIMENTS

Figure 1:
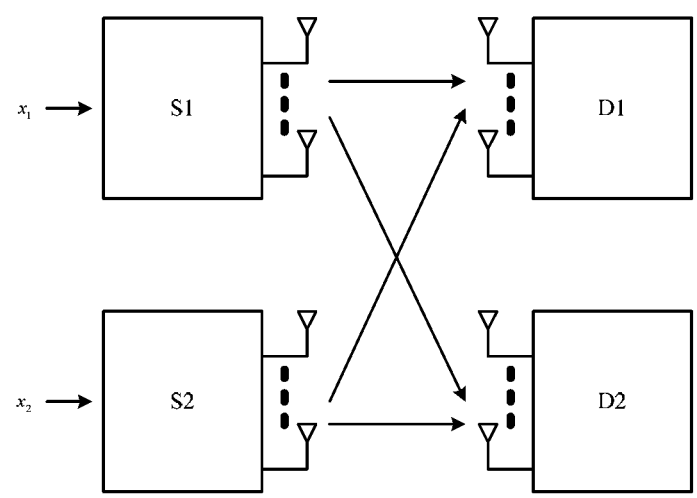
FIG. 1 is a schematic diagram of data transmission in the prior art.
Figure 2:
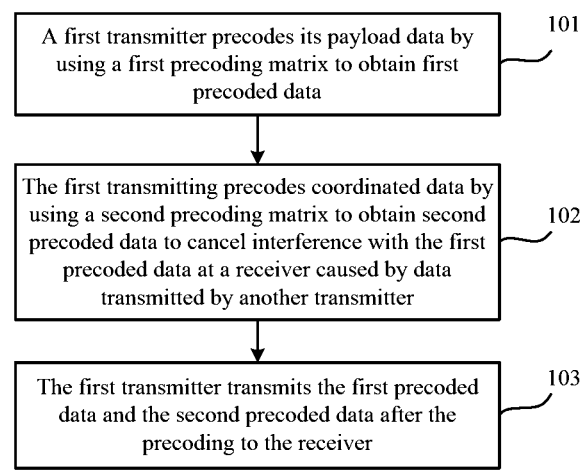
FIG. 2 is a flowchart of a data transmission method in a coordinated communication system according to a first embodiment of the present invention.

FIG. 2 is a flowchart of a data transmission method in a coordinated communication system according to a first embodiment of the present invention, including:

Step 101: A first transmitter precodes its payload data by using a first precoding matrix to obtain first precoded data.

Step 102: The first transmitter precodes coordinated data by using a second precoding matrix to obtain second precoded data to cancel interference with the first precoded data at a receiver caused by data transmitted by one or more other transmitters, where the coordinated data includes at least a part of the payload data received by the first transmitter from the one or more other transmitters.

In the embodiment of the present invention, the coordinated data refers to the data transmitted by transmitters to each other for interference cancellation. The payload data refers to the data that actually needs to be transmitted by a transmitter to a receiver, and the payload data includes coordinated data of the transmitter and private data of the transmitter.

Coordinated data may be a subset of payload data of a transmitter. To be specific, the coordinated data may include a part of the payload data of the transmitter. The coordinated data may be obtained by randomly or arbitrarily selecting from the payload data of the transmitter. For each transmitter, the quantity of the coordinated data may be half of that of the payload data.

Step 103: The first transmitter transmits the first precoded data and the second precoded data after the precoding to the receiver.

In step 102, the product of the second precoding matrix multiplied by a transmission matrix of the first transmitter may be 0. The transmission matrix is a transmission matrix between the first transmitter and its target receiver. Certainly, it is an optimal case that the product of the second precoding matrix multiplied by the transmission matrix is 0. In practice, the product of the second precoding matrix multiplied by the transmission matrix may be enabled to be close to 0 or as small as possible if the system allows.

Figure 3:
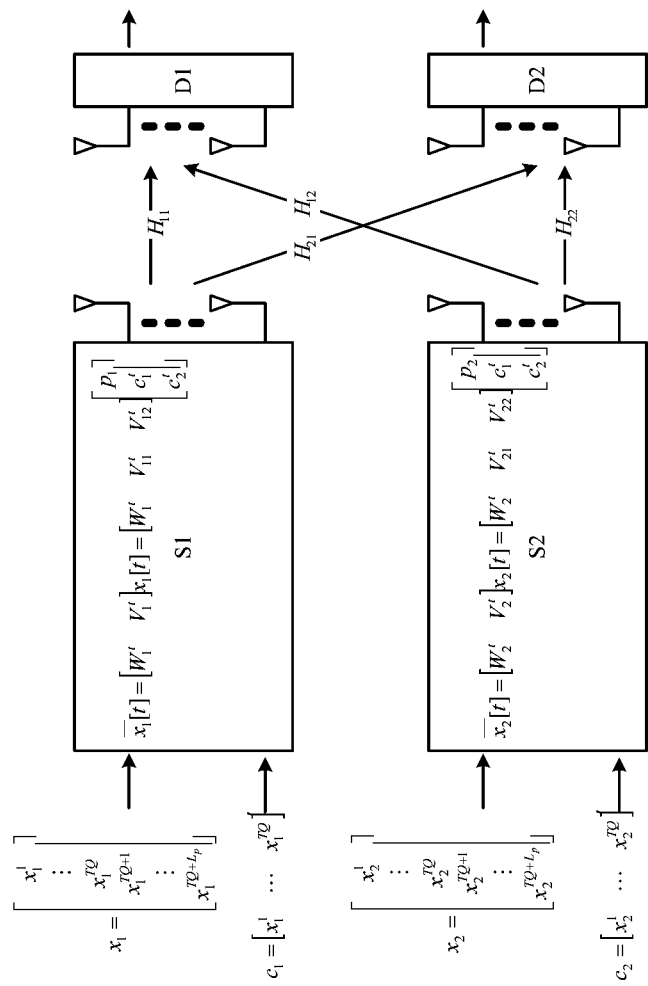
FIG. 3 is a schematic diagram of a data transmission method in a coordinated communication system according to the present invention.

FIG. 3 is a schematic diagram of a data transmission method in a coordinated communication system according to the present invention. The system is a MIMO system involving two users, including a transmitter S1, a transmitter S2, a receiver D1, and a receiver D2. The transmitter S1 is paired with the receiver D1. To be specific, the receiver D1 is a target receiver of the transmitter S1. The transmitter S2 is paired with the receiver D2. To be specific, the receiver D2 is a target receiver of the transmitter S2. The number of antennas of each transmitter and each receiver is M.

The data of the transmitter S1 is $x_1$, where $x_1$ is represented by the following matrix:

$$x_1 = \begin{bmatrix} x_1^1 \\ \vdots \\ x_1^{TQ} \\ x_1^{TQ+1} \\ \vdots \\ x_1^{TQ+L_p} \end{bmatrix} \quad (1)$$

The data transmitted by the transmitter includes a plurality of symbols, for example, $x_1^1, x_1^{TQ}, \ldots,$ and $x_1^{TQ+L}$ in formula (1). T is the number of symbol timeslots, and Q is the quantity of coordinated data transmitted between the transmitters in each symbol timeslot, that is, the number of data symbols (coordinated data) received in each symbol timeslot from another transmitter. In T symbol timeslots, the transmitter transmits $$L = TQ + \frac{T(M-Q)}{2}$$

symbols to a receiver D1 in total, where TQ corresponds to the data obtained after the coordinated data is precoded (that is, the second precoded data), and $$\frac{T(M-Q)}{2}$$

corresponds to the data (that is, the first precoded data) obtained after the payload data of the transmitter is precoded.

In formula (1), assume $p_1 = [x_1^{TQ+1} \ldots x_1^L]'$, where $[\bullet]'$ indicates a transpose operation, that is, $p_1$ is used as the private data of the transmitter S1. The private data of the transmitter S1 includes $$L_p = \frac{T(M-Q)}{2}$$

symbols. Assume $c_1 = [x_1^1 \ldots x_1^{TQ}]'$, that is, $c_1$ is used as the coordinated data of the transmitter S1. $x_1[t] = [(p_1)' \ (c_1^t)']'$ is defined, indicating the payload data transmitted from the transmitter S1 to the receiver D1 in the $t^{th}$ symbol timeslot. $c_1^t = [x_1^{tQ-(Q-1)} \ x_1^{tQ}]'$ indicates Q coordinated symbols transmitted from the transmitter S1 to the receiver D1 in the $t^{th}$ symbol timeslot. There are $$Q + \frac{T(M-Q)}{2}$$

symbols in $x_1[t]$ in total.

The data of the transmitter S2 is $x_2$, where $x_2$ is represented by the following matrix:

$$x_2 = \begin{bmatrix} x_2^1 \\ \vdots \\ x_2^{TQ} \\ x_2^{TQ+1} \\ \vdots \\ x_2^{TQ+L_p} \end{bmatrix} \quad (2)$$

Assume $p_2 = [x_2^{TQ+1} \ldots x_2^L]'$, that is, $p_2$ is used as the private data of the transmitter S2. Assume $c_2 = [x_2^1 \ldots x_2^{TQ}]'$, that is, $c_2$ is used as the coordinated data of the transmitter S2. $x_2[t] = [(p_2)' (c_2^t)']'$ is defined, indicating the payload data transmitted from the transmitter S2 to the receiver D2 in the $t^{th}$ symbol timeslot. $c_2^t = [x_2^{tQ-(Q-1)} \ x_2^{tQ}]'$ indicates Q coordinated symbols transmitted from the transmitter S2 to the receiver D2 in the $t^{th}$ symbol timeslot. There are $$Q + \frac{T(M-Q)}{2}$$

symbols in $x_2[t]$ in total.

In the embodiment of the present invention, the data transmitted by each transmitter includes two parts: One part is payload data and the other part is coordinated data transmitted by other transmitters. The coordinated data is a subset of the payload data transmitted by the other transmitters. For example, the coordinated data $c_2$ transmitted by the transmitter S1 is a subset of the payload data of the transmitter S2, and the coordinated data $c_1$ transmitted by the transmitter S2 is a subset of the payload data of the transmitter S1.

The transmitter S1 transmits the coordinated data $c_1$ to the transmitter S2, and the transmitter S2 transmits the coordinated data $c_2$ to the transmitter S1.

The transmitter S1 separately precodes the payload data and the coordinated data that is received from the other transmitters. The precoding formula is as follows:

$$\overline{x_1}[t] = [\,W_1^t \quad V_1^t\,]x_1[t] = [\,W_1^t \quad V_{11}^t \quad V_{12}^t\,] \begin{bmatrix} p_1 \\ c_1^t \\ c_2^t \end{bmatrix} \quad (3)$$

$\overline{x_1}[t]$ indicates the data obtained after the data in the $t^{th}$ symbol timeslot is precoded. $W_1^t = \lfloor w_1^{t1} \ldots w_1^{tL_p} \rfloor$ is a precoding matrix of the private data $p_1$ in the $t^{th}$ symbol timeslot, where $w_1^{tl}$ is a precoding element of the $l^{th}$ private symbol $x_1^{TQ+tl}$; $V_{11}^t = [v_{11}^{t1} \ldots v_{11}^{tQ}]$ is a precoding matrix of the coordinated data $c_1^t$, where $v_{11}^t$ is a precoding element of the coordinated symbol $x_{11}^{tl}$ in the coordinated data $c_1^t$ of the transmitter S1. $V_{12}^t = [v_{12}^{t1} \ldots v_{12}^{tQ}]$ is a precoding matrix of the coordinated data $c_2^t$, where $v_{12}^t$ is a precoding element of the coordinated symbol $x_{12}^{tl}$ in the coordinated data $c_2^t$ transmitted by the transmitter S2.

The transmitter S2 separately precodes the payload data and the coordinated data that is received from the other transmitters. The precoding formula is as follows:

$$\overline{x_2}[t] = [\,W_2^t \quad V_2^t\,]x_2[t] = [\,W_2^t \quad V_{21}^t \quad V_{22}^t\,] \begin{bmatrix} p_2 \\ c_1^t \\ c_2^t \end{bmatrix} \quad (4)$$

$\overline{x_2}[t]$ indicates the data obtained after the data in the $t^{th}$ symbol timeslot is precoded. $W_2^t = [w_2^{t1} \ldots w_2^{tL_p}]$ is a precoding matrix of the private data $p_2$ in the $t^{th}$ symbol timeslot, where $w_2^{tl}$ is a precoding element of the $l^{th}$ private symbol $x_2^{TQ+tl}$; $V_{21}^t = [v_{21}^{t1} \ldots v_{22}^{tQ}]$ is a precoding matrix of the coordinated data $c_1^t$, where $v_{21}^t$ is a precoding element of the coordinated symbol $x_{11}^{tl}$ in the coordinated data $c_1^t$ of the transmitter S2. $V_{22}^t = [v_{22}^{t1} \ldots v_{22}^{tQ}]$ is a precoding matrix of coordinated data $c_2^t$ of the transmitter S2, where $v_{22}^t$ is a precoding element of the coordinated symbol $x_{22}^{tl}$ in the coordinated data $c_2^t$.

After the precoding, the transmitters may transmit the precoded data to the receivers in MIMO mode.

A data transmission method in a coordinated communication system according to a second embodiment of the present invention includes: receiving, by a receiver, data transmitted by a first transmitter, data transmitted by the first transmitter, where the data transmitted by the first transmitter includes first precoded data obtained by precoding payload data of the first transmitter by using a first precoding matrix and second precoded data obtained by precoding coordinated data by using a second precoding matrix, the second precoded data is used to cancel interference with the first precoded data at the receiver caused by data transmitted by another transmitter, and the coordinated data is the payload data received by the first transmitter from the another transmitter.

Specifically, in the second embodiment, the receiver may receive $$TQ + \frac{T(M-Q)}{2}$$

data symbols in T symbol timeslots.

Based on the above embodiment, the method further includes cascading the data received in T symbol timeslots, cascading a channel matrix corresponding to each timeslot, and processing the received data according to a MIMO reception algorithm.

Specifically, the MIMO reception algorithm may include a zero-forcing (Zero-forcing, abbreviated to ZF) method, a minimum mean square error (Minimum Mean Square Error, abbreviated to MMSE) method, a maximum likelihood (Maximum Likelihood, abbreviated to ML) method, and a successive interference cancellation (Successive Interference Cancellation, abbreviated to SIC) method.

Referring to FIG. 3, transmission matrices between each transmitter and each receives include $H_{11}$, $H_{12}$, $H_{21}$ and $H_{22}$. A transmitter S1 transmits data to a receiver D1 based on the first transmission matrix $H_{11}$, a transmitter S2 transmits data to the receiver D1 based on the second transmission matrix $H_{12}$, the transmitter S1 transmits data to a receiver D2 based on the third transmission matrix $H_{21}$, and the transmitter S2 transmits data to the receiver D2 based on the fourth transmission matrix $H_{22}$.

In each symbol timeslot, the receiver D1 receives, based on the first transmission matrix $H_{11}$, the data transmitted by the transmitter S1, and receives, based on the second transmission matrix $H_{12}$, the data transmitted by the transmitter S2. The data received by the receivers may be represented by formula (5), where the value of k may be 1 or 2, indicating the data received by the receiver D1 and the data received by the receiver D2, respectively.

$$y_k[t] = \sum_{j=1}^{2} H_{kj}\bar{x}_j[t] + z[t] = \sum_{j=1}^{2} (H_{kj}W_j^t p_j + H_{kj}V_j^t c_k^t) + z[t] =$$

$$\sum_{j=1}^{2} \left( \sum_{l=1}^{L_p} H_{kj} w_j^{tl} x_j^{TQ+l} + \sum_{i=1}^{2} \sum_{l=1}^{Q} H_{kj} v_{ji}^{tl} x_x^{tQ-Q+1} \right) + z[t] =$$

$$\underbrace{\sum_{l=1}^{L_p} H_{kk} w_k^{tl} x_k^{TQ+l} + \sum_{j=1}^{2} \sum_{l=1}^{Q} H_{kj} v_{jk}^{tl} x_k^{tQ-Q+1}}_{\text{payload data}} +$$

$$\underbrace{\sum_{j \ne k}^{2} \sum_{l=1}^{L_p} H_{kj} w_j^{tl} x_j^{TQ+l} + \sum_{j=1}^{2} \sum_{i \ne k}^{2} \sum_{l=1}^{Q} H_{kj} v_{ji}^{tl} x_k^{tQ-Q+1}}_{\text{interference}} + z[t] =$$

$$\underbrace{\sum_{l=1}^{L_p} H_{kk} w_k^{tl} x_k^{TQ+l} + \sum_{j=1}^{2} \sum_{l=1}^{Q} H_{kj} \tilde{v}_k^{tl} x_k^{tQ-Q+1}}_{\text{payload data}} +$$

$$\underbrace{\sum_{j \ne k}^{2} \sum_{l=1}^{L_p} H_{kj} w_j^{tl} x_j^{TQ+l} + \sum_{i \ne k}^{2} \sum_{l=1}^{Q} H_k \tilde{v}_k^{tl} x_i^{tQ-Q+1}}_{\text{interference}} + z[t]$$

In formula (5), z[t] indicates a noise, $H_k = [H_{k1}\ H_{k2}]$ indicates each transmission matrix, $\tilde{v}_i^{tl} = [(v_{1i}^{tl})'\ (v_{2i}^{tl})']' \in C^{2M \times 1}$ is a precoding element of the coordinated symbol $x_i^{tQ-q+1}$, and $\tilde{V}_i^t = [\tilde{v}_i^{t1} \ldots \tilde{v}_i^{tQ}] \in C^{2M \times Q}$ is a precoding matrix of all the Q coordinated symbols of the transmitter i (the value of i may be 1 or 2); payload data indicates the payload data, interference indicates an interference item, and other similar parameter symbols have the same meanings as described above.

In the embodiment of the present invention, assume that $\tilde{V}_k^t$, $\forall i$ and t satisfy the conditions (6), (7), and (8):

$$H_k \tilde{V}_i^t = 0, \forall i \ne k \quad (6)$$

$$H_k \tilde{V}_k^t \ne 0, \forall k \quad (7)$$

$$\text{rank}(H_k \tilde{V}_k^t) = Q, \forall k \quad (8)$$

In formula (8), rank(•) indicates the rank of the matrix, and $\forall i$ indicates a random i.

Based on the above conditions, formula (5) may be evolved into:

$$y_k[t] = \quad (9)$$

$$\underbrace{\sum_{l=1}^{L_p} H_{kk} w_k^{tl} x_k^{TQ+l} + \sum_{j=1}^{2} \sum_{l=1}^{Q} H_{kj} \tilde{v}_k^{tl} x_k^{tQ-Q+1}}_{\text{payload data}} + \underbrace{\sum_{j \ne k}^{2} \sum_{l=1}^{L_p} H_{kj} w_j^{tl} x_j^{TQ+l}}_{\text{interference}} + z[t]$$

By comparison between formula (5) and formula (9), it can be seen that one interference item is reduced in formula (9).

It can be seen from formula (9) that, after the receiver i receives the coordinated data transmitted by the transmitter k, the coordinated data transmitted by the transmitter k is cancelled. To be specific, the receiver does not process the coordinated data transmitted by the transmitter k. In this way, the interference with the receiver i caused by the data transmitted by the transmitter k is reduced.

As shown in formula (5), the receiver receives $2L_p + Q$ data streams in total, and fails to parse the data streams in a single symbol timeslot. Therefore, the receiver $D_k$ (the value of k may be 1 or 2) jointly processes the symbols received in the T consecutive symbol timeslots.

According to the data transmission method in the coordinated communication system provided in the embodiment of the present invention, during precoding, the first transmitter codes the payload data of the transmitters by using the first precoding matrix, and codes the coordinated data received from other transmitters by using the second precoding matrix, where the product of the second precoding matrix multiplied by the transmission matrix between the first transmitter and the first receiver may be 0, and then transmits the precoded payload data and the precoded coordinated data based on the transmission matrix. The product of the second precoding matrix multiplied by the transmission matrix is 0. Therefore, the data received by the first receiver based on the transmission matrix does not include the coordinated data. To be specific, the first receiver does not receive a part of payload data transmitted by other transmitters, thereby reducing interference between the transmitters.

With the method provided in the embodiment of the present invention, the degree of freedom (indicating the maximum number of data streams in the system) of the MIMO system may be $$\frac{2L_p + 2TQ}{T} = M + Q.$$

Compared with the MIMO system in the prior art, the embodiment of the present invention enhances the degree of freedom.

The following uses a specific example to describe the implementation process of the data transmission method in the MIMO system according to the present invention.

Figure 4:
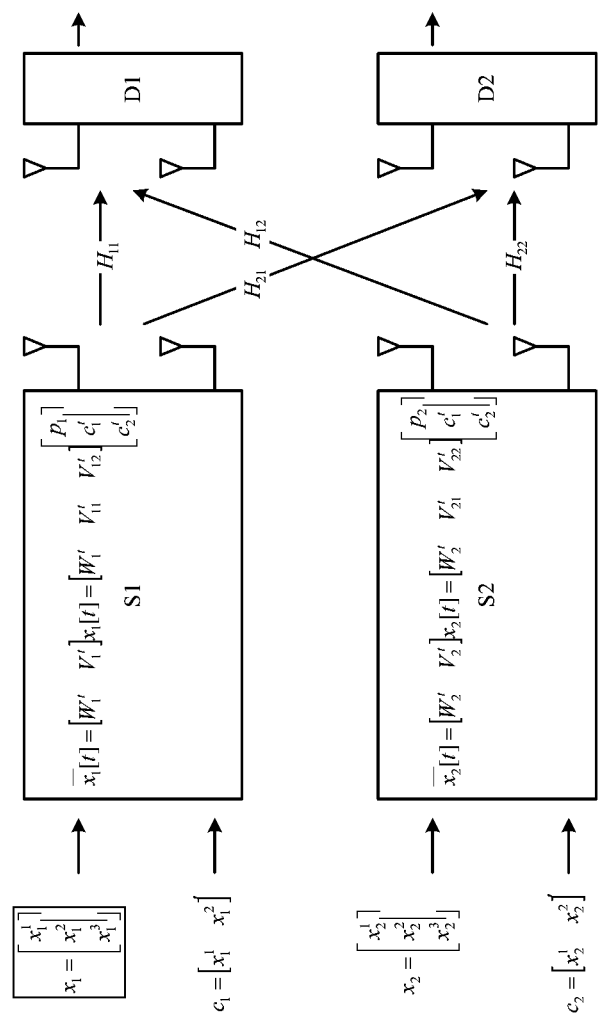
FIG. 4 is a MIMO system involving two users according to an embodiment of the present invention.

FIG. 4 shows a MOMO system involving two users according to an embodiment of the present invention, including a transmitter S1, a transmitter S2, a receiver D1, and a receiver D2. Each transmitter and each receiver include two antennas. The system is a 2×2 MIMO system.

The data transmitted by the transmitter S1 is $x_1$, which is represented by the following formula:

$$x_1 = \begin{bmatrix} x_1^1 \\ x_1^2 \\ x_1^3 \end{bmatrix} \quad (11)$$

The target data transmitted by the transmitter S2 is $x_2$, which is represented by the following formula:

$$x_2 = \begin{bmatrix} x_2^1 \\ x_2^2 \\ x_2^3 \end{bmatrix} \quad (12)$$

The coordinated data of the transmitter S1 is $c_1$, where $c_1 = [x_1^1\ x_1^2]'$. The coordinated data $c_1$ needs to be transmitted to the transmitter S2. The private data of the transmitter S1 is $x_1^3$. The coordinated data of the transmitter S2 is $c_2$, where $c_2=[x_2^1\ x_2^2]'$. The coordinated data $c_2$ needs to be transmitted to the transmitter S1. The private data of the transmitter S2 is $x_2^3$.

In the system, the value of the number M of antennas is 2, the value of the total number T of symbol timeslots is 2, the value of the number Q of coordinated symbols interchanged within each symbol timeslot is 1, and the number L of symbols transmitted by each transmitter in every T symbol timeslots is $$TQ + \frac{T(M-Q)}{2} = 3,$$

where $$\frac{T(M-Q)}{2} = 1.$$

For the transmitter $S_k$ (the value of k is 1 or 2, indicating the transmitter S1 and the transmitter S2, respectively), $p_k = x_k^3$ indicates the private data of the transmitter k, and $c_k=[x_k^1\ x_k^2]'$ indicates the coordinated data transmitted by the transmitter $S_k$ to another transmitter. Within the $t^{th}$ symbol timeslot, the payload data transmitted by the transmitter $S_k$ is $$x_k[t] = [\ (p_k)'\ (c_k^t)'\ ]' = \begin{bmatrix} x_k^3 \\ x_k^t \end{bmatrix},$$

where t={1, 2}. All types of data transmitted by the transmitter $S_k$ may be as shown in the following table:

The data received by the receiver $D_k$ is as follows:

$$y_k[t] = \underbrace{H_{kk} w_k^1 x_k^3 + \sum_{j=1}^{2} H_{kj} v_{jk}^t x_k^t}_{\text{payload data}} + \underbrace{\sum_{j \neq k}^{2} H_{kj} w_j^t x_k^t + \sum_{j=1}^{2}\sum_{i \neq k}^{2} H_{kj} v_{jk}^t x_k^t + z[t]}_{\text{interference}} \quad (13)$$

$$= \underbrace{H_{kk} w_k^1 x_k^3 + \sum_{j=1}^{2} H_{kj} v_{jk}^t x_k^t}_{\text{payload data}} + \underbrace{\sum_{j \neq k}^{2} H_{kj} w_j^t x_k^t + \sum_{i \neq k}^{2} H_k \tilde{v}_i^t x_k^t + z[t]}_{\text{interference}}$$

Therefore, the following results are obtained:

$$y_1[1] = \underbrace{H_{11} w_1^1 x_1^3 + H_1 \tilde{v}_1^1 x_1^1}_{\text{payload data}} + \underbrace{H_{12} w_2^1 x_2^3 + H_1 \tilde{v}_2^1 x_2^1}_{\text{interference}} + z[1];$$

$$y_1[2] = \underbrace{H_{11} w_1^2 x_1^3 + H_1 \tilde{v}_1^2 x_1^2}_{\text{payload data}} + \underbrace{H_{12} w_2^2 x_2^3 + H_1 \tilde{v}_2^2 x_2^2}_{\text{interference}} + z[2];$$

$$y_2[1] = \underbrace{H_{21} w_1^1 x_1^3 + H_1 \tilde{v}_1^1 x_1^1}_{\text{payload data}} + \underbrace{H_{22} w_2^1 x_2^3 + H_2 \tilde{v}_2^1 x_2^1}_{\text{interference}} + z[1];$$

$$y_2[2] = \underbrace{H_{21} w_1^2 x_1^3 + H_2 \tilde{v}_1^2 x_1^2}_{\text{payload data}} + \underbrace{H_{22} w_2^2 x_2^3 + H_2 \tilde{v}_2^2 x_2^2}_{\text{interference}} + z[2].$$

$w_1^1$ and $w_1^2$ are precoded symbols of the private symbols of the private data of the transmitter S1, $w_2^1$ and $w_2^2$ are precoded symbols of the private symbols of the private data of the transmitter S2, $\tilde{v}_1^1$ and $\tilde{v}_1^2$ are precoded symbols of the coordinated data of the transmitter S1, $\tilde{v}_2^1$ and $\tilde{v}_2^2$ are precoded symbols of the coordinated data of the transmitter S2,

| Symbol Timeslot | Transmitted Symbol | Meaning of the Symbol | Coding Matrix |
|---|---|---|---|
| t = 1 | $x_k[1] = \begin{bmatrix} p_k \\ c_1^1 \\ c_2^1 \end{bmatrix} = \begin{bmatrix} x_k^3 \\ x_1^1 \\ x_2^1 \end{bmatrix}$ | $p_k$ is the private data of the transmitter $S_k$. | $W_k^1 = w_k^1$ is a precoding matrix of the private data of the transmitter $S_k$. |
| | | $c_1^1 = x_1^1$ is the coordinated data of the transmitter S1. | $V_{k1}^1 = v_{k1}^1$ is a precoding matrix for the transmitter $S_k$ to precode the coordinated data of the transmitter S1. |
| | | $c_2^1 = x_2^1$ is the coordinated data of the transmitter S2. | $V_{k2}^1 = v_{k2}^1$ is a precoding matrix for the transmitter $S_k$ to precode the coordinated data of the transmitter S2. |
| t = 2 | $x_k[2] = \begin{bmatrix} p_k \\ c_1^2 \\ c_2^2 \end{bmatrix} = \begin{bmatrix} x_k^3 \\ x_1^2 \\ x_2^2 \end{bmatrix}$ | $p_k$ is the private data of the transmitter $S_k$. | $W_k^{21} = w_k^2$ is a precoding matrix of the private data of the transmitter $S_k$. |
| | | $c_1^2 = x_1^2$ is the coordinated data of the transmitter S1. | $V_{k1}^2 = v_{k1}^2$ is a precoding matrix for the transmitter $S_k$ to precode the coordinated data of the transmitter S1. |
| | | $c_2^2 = x_2^2$ is the coordinated data of the transmitter S2. | $V_{k2}^2 = v_{k2}^2$ is a precoding matrix for the transmitter $S_k$ to precode the coordinated data of the transmitter S2. | z[t] indicates a noise, where t=1, 2, H is the corresponding transmission matrix, and $H_k=[H_{k1}\ H_{k2}]$, and $$\tilde{V}_k^t = \tilde{v}_k^t = \begin{bmatrix} v_{1i}^t \\ v_{2i}^t \end{bmatrix},$$

and the following conditions also need to be satisfied:

$H_1\tilde{V}_2^t=0, H_1\tilde{V}_1^t\neq 0, \text{rank}(H_1\tilde{V}_1^t)=1;$ $H_2\tilde{V}_1^t=0, H_2\tilde{V}_2^t\neq 0, \text{rank}(H_2\tilde{V}_2^t)=1.$ The data received by the receiver D1 within two consecutive symbol timeslots is:

$$\tilde{y}_1 = \begin{bmatrix} y_1[1] \\ y_1[2] \end{bmatrix} = \tilde{H}\begin{bmatrix} x_1^3 \\ x_2^3 \\ x_1^1 \\ x_1^2 \end{bmatrix} + \begin{bmatrix} z[1] \\ z[2] \end{bmatrix}, \quad (14)$$

where $\tilde{H}_1 = \begin{bmatrix} H_{11}w_1^1 & H_{12}w_2^1 & H_1\tilde{v}_1^1 & 0 \\ H_{11}w_1^2 & H_{12}w_2^2 & 0 & H_{11}\tilde{v}_1^2 \end{bmatrix}$ Subsequently, the receiver D1 may use various detection algorithms to process the received data.

Figure 5:
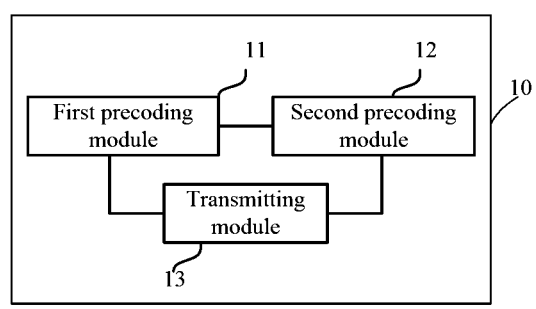
FIG. 5 is a schematic structural diagram of an embodiment illustrating a transmitter in a coordinated communication system according to the present invention.

FIG. 5 is a schematic structural diagram of an embodiment illustrating a transmitter in a coordinated communication system according to the present invention. A transmitter 10 includes a first precoding module 11, a second precoding module 12, and a transmitting module 13. The first precoding module 11 is configured to precode payload data of the transmitter by using a first precoding matrix to obtain first precoded data. The second precoding module 12 is configured to precode coordinated data by using a second precoding matrix to obtain second precoded data to cancel interference with the first precoded data at a receiver caused by data transmitted by another transmitter. The coordinated data includes at least a part of the payload data that is received by the first transmitter and transmitted by the another transmitter. The transmitting module 13 is connected to the first precoding module 11 and the second precoding module 12 and configured to transmit the first precoded data and the second precoded data after the precoding to the receiver.

The transmitting module 13 may be specifically configured to transmit $$TQ + \frac{T(M-Q)}{2}$$

data symbols to the receiver in T symbol timeslots.

The second precoding module 12 may be specifically configured to precode the coordinated data by using the second precoding matrix, where the product of the second precoding matrix multiplied by a transmission matrix of the transmitter is 0.

For specific working principles of each module in the transmitter according to the embodiment illustrated in FIG. 5, refer to the description in the above method embodiments.

Figure 6:
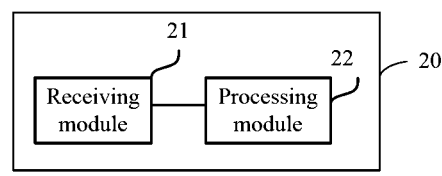
FIG. 6 is a schematic structural diagram of an embodiment illustrating a receiver in a coordinated communication system according to the present invention.

FIG. 6 is a schematic structural diagram of an embodiment illustrating a receiver in the coordinated communication system according to the present invention. A receiver 20 includes a receiving module 21. The receiving module 21 is configured to receive data transmitted by a first transmitter, where the data transmitted by the first transmitter includes payload data precoded by using a first precoding matrix and second precoded data obtained by precoding coordinated data by using a second precoding matrix. The coordinated data includes at least a part of the second precoded data of payload data that is received by the first transmitter and transmitted by the another transmitter, to cancel interference with the first precoded data at the receiver caused by data transmitted by the another transmitter. The product of the second precoding matrix multiplied by a transmission matrix is 0. The transmission matrix is a transmission matrix between the first transmitter the first receiver. The first receiver is a target receiver of the first transmitter.

The receiving module 21 may be specifically configured to receive $$TQ + \frac{T(M-Q)}{2}$$

data symbols in T symbol timeslots.

The receiver illustrated in FIG. 6 may further include a processing module 22. The processing module 22 is connected to the receiving module 21. The processing module 22 is specifically configured to cascade the data received in the T symbol timeslots, cascade a channel matrix corresponding to each timeslot, and process the received data according to a MIMO reception algorithm. Specifically, the methods such as the ZF method, MMSE method, ML method, and SIC method may be used.

For working principles of each module in the receiver illustrated in FIG. 6, refer to the description in the above method embodiments.

The transmitter and the receiver provided in the embodiments of the present invention may be apparatuses in a system for data transmission based on the MIMO technology. For example, if data is transmitted based on the MIMO mode between a user equipment (User Equipment, abbreviated to UE) and a base station, the transmitter may be the UE and the receiver may be the base station. Alternatively, the transmitter may be the base station and the receiver may be the UE.

According to the transmitter and the receiver in the coordinated communication system provided in the embodiments of the present invention, the precoding module precodes the payload data of each transmitter by using the first precoding matrix, and precodes the coordinated data received from another transmitter by using the second precoding matrix; and the transmitting module transmits the precoded payload data and the precoded coordinated data based on the transmission matrix. The product of the second precoding matrix multiplied by the transmission matrix is 0. Therefore, the data received by the receiver based on the transmission matrix does not include the coordinated data. To be specific, the receiver does not receive a part of payload data transmitted by another transmitter, thereby reducing interference between the transmitters.

Those of ordinary skill in the art should understand that all or a part of the steps of the method embodiments may be implemented by a program instructing relevant hardware. The program may be stored in a computer readable storage medium. When the program is run, the steps of the method embodiments are performed. The storage medium may be any medium that is capable of storing program codes, such as a ROM, a RAM, a magnetic disk, or a CD-ROM.

What is claimed is:

1. A method of sending data in a wireless communication system, the wireless communication system comprising a first transmitter in communication with a first receiver and a second transmitter in communication with a second receiver, the first transmitter transmitting first payload data to the first receiver, the first payload data comprising first private data and first coordinated data, the second transmitter transmitting second payload data to the second receiver, the second payload data comprising second private data and second coordinated data, the method comprising:

sending, by the first transmitter, the first coordinated data to the second transmitter;

receiving, by the first transmitter, the second coordinated data from the second transmitter;

precoding, by the first transmitter, the first private data by using a first precoding matrix to obtain precoded payload data;

precoding, by the first transmitter, a combination of the first coordinated data and the second coordinated data by using a second precoding matrix to obtain precoded coordinated data; and transmitting, by the first transmitter, the precoded payload data and the precoded coordinated data to the first receiver, wherein the precoded coordinated data is designated for interference cancellation at the first receiver caused by transmission of the second payload data from the second transmitter.

2. The method of claim 1, wherein the precoded payload data and the precoded coordinated data comprise a plurality of data symbols being transmitted in a plurality of symbol timeslots.

3. The method of claim 1, wherein the second precoding matrix comprises a third precoding matrix designated for precoding of the first coordinated data and a fourth precoding matrix designated for precoding of the second coordinated data.

4. The method of claim 1, wherein the first coordinated data is randomly selected from the first payload data.

5. The method of claim 1, wherein the precoded payload data and the precoded coordinated data are transmitted from a plurality of antennas of the first transmitter to the first receiver.

6. An apparatus for sending data in a wireless communication system, the wireless communication system comprising the apparatus in communication with a first receiver and a second transmitter in communication with a second receiver, the apparatus transmitting first payload data to the first receiver, the first payload data comprising first private data and first coordinated data, the second transmitter transmitting second payload data to the second receiver, the second payload data comprising second private data and second coordinated data, the apparatus comprising:

a plurality of antennas; and a first transmitter, which is configured to:
send the first coordinated data to the second transmitter;
receive the second coordinated data from the second transmitter;
precode the first private data by using a first precoding matrix to obtain precoded payload data;
precode a combination of the first coordinated data and the second coordinated data by using a second precoding matrix to obtain precoded coordinated data; and
transmit the precoded payload data and the precoded coordinated data to the first receiver via the plurality of antennas, wherein the precoded coordinated data is designated for interference cancellation at the first receiver caused by transmission of the second payload data from the second transmitter.

7. The apparatus of claim 6, wherein the precoded payload data and the precoded coordinated data comprise a plurality of data symbols being transmitted in a plurality of symbol timeslots.

8. The apparatus of claim 6, wherein the second precoding matrix comprises a third precoding matrix designated for precoding of the first coordinated data and a fourth precoding matrix designated for precoding of the second coordinated data.

9. The apparatus of claim 6, wherein the first coordinated data is randomly selected from the first payload data.

10. The apparatus of claim 6, wherein the first coordinated data includes half of the first payload data.

11. A method of receiving data in a wireless communication system, the wireless communication system comprising a first transmitter in communication with a first receiver and a second transmitter in communication with a second receiver, the first transmitter transmitting first payload data to the first receiver, the first payload data comprising first private data and first coordinated data, the second transmitter transmitting second payload data to the second receiver, the second payload data comprising second private data and second coordinated data, the method comprising:

receiving, by the first receiver, precoded payload data and precoded coordinated data, wherein the precoded payload data is obtained from precoding the first private data by using a first precoding matrix, the precoded coordinated data is obtained from precoding a combination of the first coordinated data and the second coordinated data by using a second precoding matrix; and performing, by the first receiver, interference cancellation according to the precoded coordinated data, wherein the interference is caused by transmission of the second payload data from the second transmitter.

12. The method of claim 11, wherein the precoded payload data and the precoded coordinated data comprise a plurality of data symbols being transmitted in a plurality of symbol timeslots.

13. The method of claim 11, wherein the second precoding matrix comprises a third precoding matrix designated for precoding of the first coordinated data and a fourth precoding matrix designated for precoding of the second coordinated data.

14. The method of claim 11, wherein the first coordinated data is randomly selected from the first payload data.

15. The method of claim 11, wherein the precoded payload data and the precoded coordinated data are received from a plurality of antennas of the first receiver.

16. An apparatus for receiving data in a wireless communication system, the wireless communication system comprising a first transmitter in communication with the apparatus and a second transmitter in communication with a second receiver, the first transmitter transmitting first payload data to the apparatus, the first payload data comprising first private data and first coordinated data, the second transmitter transmitting second payload data to the second receiver, the second payload data comprising second private data and second coordinated data, the apparatus comprising:

a plurality of antennas; and a first receiver, which is configured to:
receive, via the plurality of antennas, precoded payload data and precoded coordinated data, wherein the precoded payload data is obtained from precoding the first private data by using a first precoding matrix, the precoded coordinated data is obtained from precoding a combination of the first coordinated data and the second coordinated data by using a second precoding matrix; and perform interference cancellation according to the precoded coordinated data, wherein the interference is caused by transmission of the second payload data from the second transmitter.

17. The apparatus of claim 16, wherein the precoded payload data and the precoded coordinated data comprise a plurality of data symbols being transmitted in a plurality of symbol timeslots.

18. The apparatus of claim 16, wherein the second precoding matrix comprises a third precoding matrix designated for precoding of the first coordinated data and a fourth precoding matrix designated for precoding of the second coordinated data.

19. The apparatus of claim 16, wherein the first coordinated data is randomly selected from the first payload data.

20. The apparatus of claim 16, wherein the first coordinated data includes half of the first payload data.

* * * * *

UNITED STATES PATENT AND TRADEMARK OFFICE
CERTIFICATE OF CORRECTION

| | | |
|---|---|---|
| PATENT NO. | : 8,731,095 B2 | Page 1 of 1 |
| APPLICATION NO. | : 13/760912 | |
| DATED | : May 20, 2014 | |
| INVENTOR(S) | : Yu et al. | |

It is certified that error appears in the above-identified patent and that said Letters Patent is hereby corrected as shown below:

*Title page, item (71), Applicant's City of Residence "Guangdong (CN)" should read --Shenzhen (CN)--.*

Signed and Sealed this
Ninth Day of September, 2014

Michelle K. Lee
*Deputy Director of the United States Patent and Trademark Office*